Oct. 4, 1955

G. C. WYMAN 2,719,645

COOKING UTENSIL COVER

Filed Sept. 29, 1951

Inventor
Glenn C. Wyman

United States Patent Office 2,719,645
Patented Oct. 4, 1955

2,719,645

COOKING UTENSIL COVER

Glenn C. Wyman, Rome, N. Y., assignor to Revere Copper and Brass Incorporated, Rome, N. Y., a corporation of Maryland Application September 29, 1951, Serial No. 248,905

1 Claim. (Cl. 220—42)

My invention relates to removable covers for cooking utensils such as sauce pans and the like.

The invention has among its objects the provision of an improved cover, the portion of which received within the top opening of the sauce pan or other container being provided with a stiffening bead that readily permits drainage into the container of condensate collecting on the interior surfaces of the cover and that avoids catching food particles, the bead also being so disposed and shaped as to secure a proper bearing of the beaded portion of the cover on the interior walls of the container and to permit such portion to be readily cleaned. These and other objects of the invention will be best understood from the following description when read in the light of the accompanying drawings, while the scope of the invention will be more particularly pointed out in the appended claim.

Figure 1:
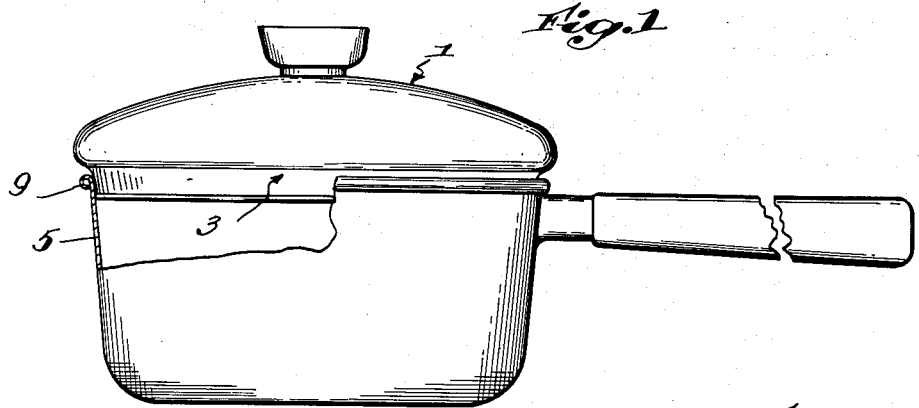
Fig. 1 is a side elevation of a sauce pan with a cover according to the invention applied thereto, with parts broken away.

Referring to the drawings, the cover according to the invention comprises a body portion 1 integrally formed with a depending annular skirt 3 adapted to be received within the top opening of a sauce pan or other cooking vessel 5.

As shown, the outer annular surface of the skirt and the inner annular surface of the container are straight in profile. Preferably, the walls of the container are flared outwardly as they extend upwardly, and the walls of the skirt are flared inwardly as they extend downwardly, so that the outer walls of the skirt will contact with the inner walls of the container under the weight of the cover to secure a satisfactory bearing of the skirt on the container and make the joint between the two more or less steam tight. However, if desired, the skirt and container walls need not be flared, in which case the skirt may be permitted to extend into the container to cause its radially outwardly extending shoulder portion 7 to rest on the upper edge of the container, which edge commonly will be beaded as shown at 9.

The skirt of the cover, which latter is formed of relatively thin sheet metal say about 0.020 of an inch in thickness, is provided at its lower edge with a reinforcing bead by folding, by means of a pressing operation, its lower edge portion 11 outwardly and upwardly, the outer annular surface 13 of this portion 11 being straight in profile while its inner annular surface lies tightly against the complementary outer annular surface of the contiguous portion 15 of the skirt. At the top flat edge 17 of the portion 11 the skirt is offset radially outward, as shown at 19, to cause the outer annular surface 21 of its portion 23 to be in alignment with the outer annular straight profiled surface 13 of said portion 11, the surface 21 also being straight in profile.

Figure 2:
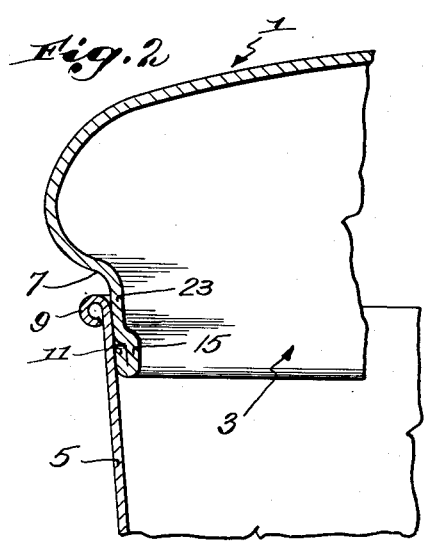
Fig. 2 is a fragmentary vertical section of the sauce pan and cover according to Fig. 1 on an enlarged scale.
Figure 3:
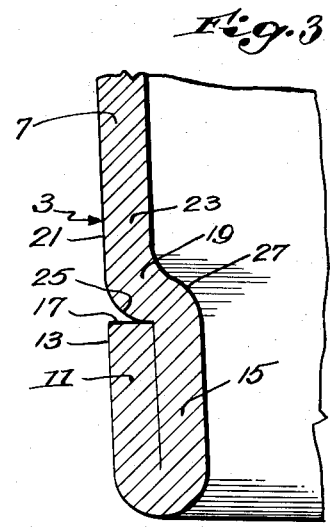
Fig. 3 illustrates a detail of the cover on an enlarged scale.

The above described construction results in the entire outer surface of the portion of the skirt received within the container being of straight continuous profile except for the space between the outer surface 25 of the offset 19 and the top edge 17 of the folded portion 11 of the skirt. Preferably the pressing operation is such that the surface 25 is made to conform to the edge 17 as closely as possible so as to keep the space between the two as small as possible, it being understood, that because of the thin gauge of the material of the cover, that space will be very much smaller than as shown in Figs. 2 and 3 in which the thickness of such material is much exaggerated. As a result little or no dirt will be caught on the outer surface of the skirt, and such space being on such outer surface that surface may readily cleaned. It will also be observed that having the outer surfaces 13 and 21 of the skirt of straight profile and in alignment with each other secures a wide bearing of the skirt on the interior surface of the container so as properly to support the cover and secure to a satisfactory degree a proper sealing of the joint between the cover and container.

Figure 4:
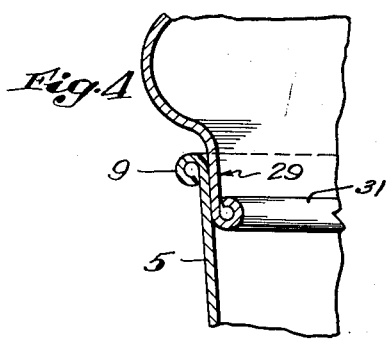
Fig. 4 is a section, corresponding to Fig. 2, showing a prior art cover.
Figure 5:
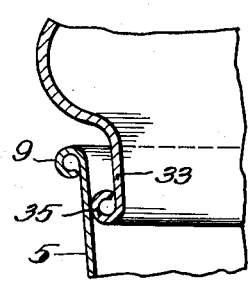
Fig. 5 is a section, corresponding to Fig. 2, showing another prior art cover.

It will be observed from the construction above described that the inner surface 27 of the offset 19 of the skirt 3 is such that condensate collecting on the inner surface of the cover may readily flow down the inner wall of the skirt into the container. With prior art covers as heretofore commonly constructed the skirt 29 (Fig. 4) is commonly beaded at its lower edge in the way shown at 31. Such a bead prevents free drainage of condensate back into the container and tends to trap such condensate and give rise to objectionable odors due to fermentation and the like of the trapped material and otherwise create unsanitary conditions which will not be created with covers constructed according to the present invention. Heretofore it has been attempted to place the reinforcing bead of the skirt 33 (Fig. 5) of a cover at the outer side of the skirt in the way shown at 35. Placing the bead as shown in Fig. 5 will permit free drainage of condensate back into the container, but the resulting construction, as distinguished from that according to applicant's invention, is such that a poor bearing of the cover on the container walls is obtained. Furthermore, a bead such as shown at 35 tends to trap dirt and moisture within the interior of the bead, which dirt and moisture cannot be readily removed by a cleaning operation.

It will be understood that within the scope of the appended claim wide deviations may be made from the form of the invention described without departing from the spirit of the invention.

I claim:

A sauce pan or other cooking utensil comprising a food container and a removable and replaceable cover therefor, the container side wall surfaces adjacent the container top opening presenting an annular interior lateral seating surface of straight profile throughout its width, the cover having a body portion and a depending inwardly offset skirt formed integrally with such portion, which skirt is adapted to be removably and replaceably received by said top opening, the skirt operatively presenting an exterior annular lateral surface of straight profile throughout its width extending upwardly from its lower free edge adapted to seat throughout its width on said straight profiled seating surface of the container when said skirt is so received, said skirt adjacent its lower free edge being offset inwardly and folded outwardly and upwardly to form an annular portion of material width lying substantially throughout its width tightly against the complementary annular surface of the offset contiguous portion of said skirt, the outer annular exterior surface of such folded over portion being of straight profile and throughout its width forming the lower part of said straight profiled surface of the skirt, the portion of the skirt immediately above the free edge of said folded over portion thereof having an outer annular lateral surface of straight profile throughout its width in alignment with the outer lateral straight profiled surface of said folded over portion.

References Cited in the file of this patent

UNITED STATES PATENTS

| | | |
|---|---|---|
| 495,012 | Brinton | Apr. 11, 1893 |
| 1,701,384 | McGarvey | Feb. 5, 1929 |
| 2,262,066 | Taylor | Nov. 11, 1941 |
| 2,348,750 | Peck | May 16, 1944 |